(12) United States Patent
Suzuki et al.

(10) Patent No.: US 6,829,066 B2
(45) Date of Patent: Dec. 7, 2004

(54) HOLOGRAM SCREEN

(75) Inventors: Kazunori Suzuki, Nagoya (JP); Tooru Matsumoto, Ichinomiya (JP); Kenichiro Takada, Kuwana (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/003,110

(22) Filed: Dec. 6, 2001

(65) Prior Publication Data
US 2002/0071143 A1 Jun. 13, 2002

(30) Foreign Application Priority Data

Dec. 8, 2000  (JP) ........................................ 2000-374979
Oct. 9, 2001  (JP) ........................................ 2001-311655

(51) Int. Cl.[7] .............................. G02B 5/32; G03H 1/00
(52) U.S. Cl. ............................................. 359/15; 359/1
(58) Field of Search ................................ 359/1, 13, 15

(56) References Cited

U.S. PATENT DOCUMENTS

| | | | | |
|---|---|---|---|---|
| 4,998,784 A | * | 3/1991 | Freeman et al. ............... | 359/15 |
| 5,497,170 A | * | 3/1996 | Kato et al. ..................... | 345/9 |
| 5,631,107 A | * | 5/1997 | Tarumi et al. .................. | 430/1 |
| 5,654,116 A | * | 8/1997 | Kato et al. ...................... | 430/1 |
| 5,677,701 A | * | 10/1997 | Okuyama et al. ............... | 345/7 |
| 5,898,511 A | * | 4/1999 | Mizutani et al. ............... | 359/13 |
| 6,055,100 A | * | 4/2000 | Kirk ............................... | 359/457 |
| 6,111,670 A | * | 8/2000 | Hattori et al. .................. | 359/15 |
| 6,141,123 A | * | 10/2000 | Nakashima et al. ............ | 359/3 |
| 6,259,541 B1 | * | 7/2001 | Town .............................. | 359/1 |
| 2002/0145772 A1 | * | 10/2002 | Hegel ............................. | 359/1 |

FOREIGN PATENT DOCUMENTS

| | | | |
|---|---|---|---|
| EP | 0 353 603 A2 | * | 2/1990 |
| JP | 09-185011 | | 7/1997 |
| JP | 11-102153 | | 4/1999 |

* cited by examiner

*Primary Examiner*—John Juba, Jr.
(74) *Attorney, Agent, or Firm*—Nixon & Vanderhye, P.C.

(57) ABSTRACT

The present invention provides a hologram screen which is capable of preventing separation, and damage to, a hologram film and which permits the hologram film to be reused easily. The present invention relates to a hologram screen that is comprised of a hologram film having the function of diffracting the light projected from a projector, and first and second transparent members that together sandwich the hologram film from the front and back surfaces thereof so as to cover the same.

15 Claims, 13 Drawing Sheets

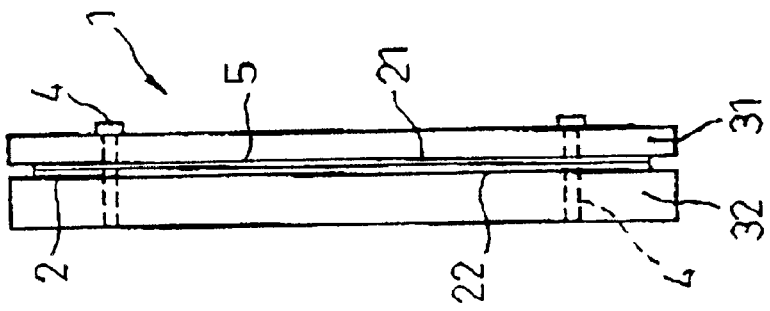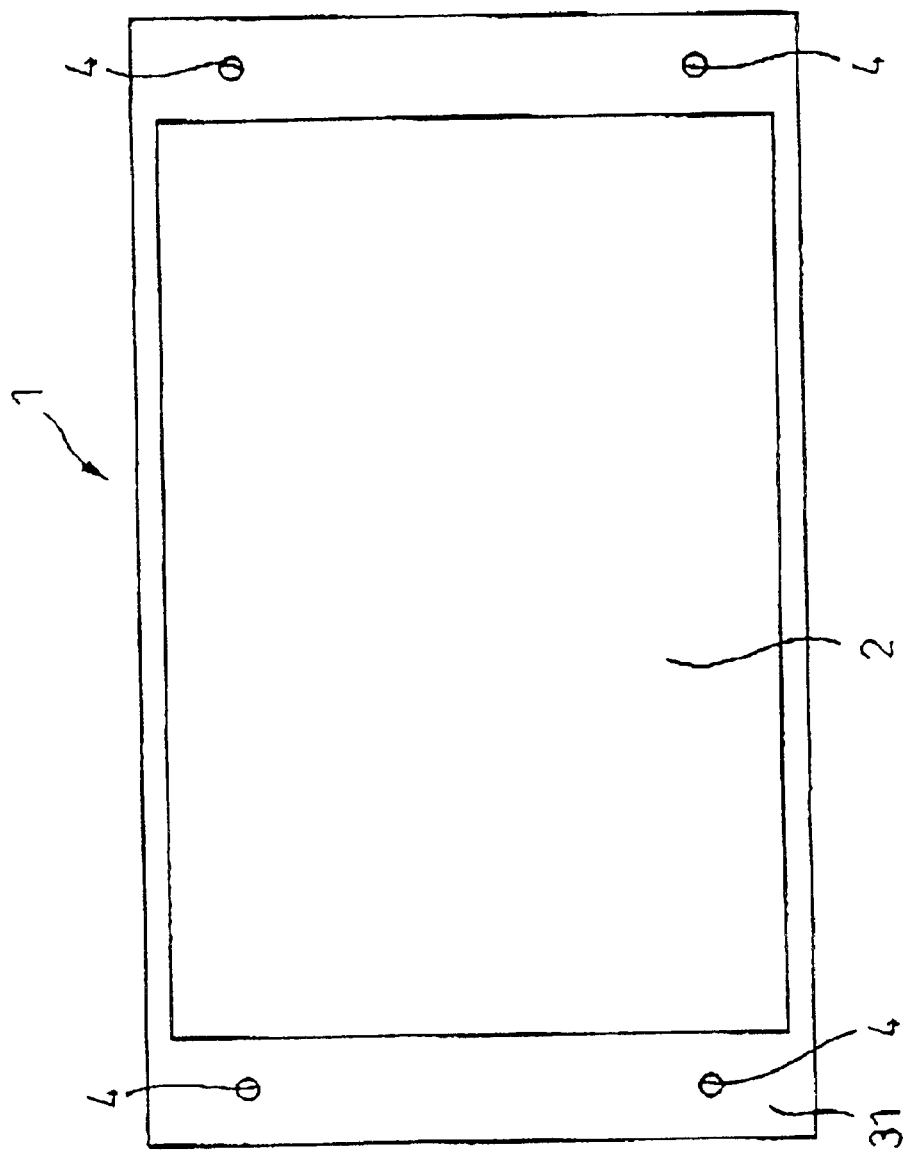

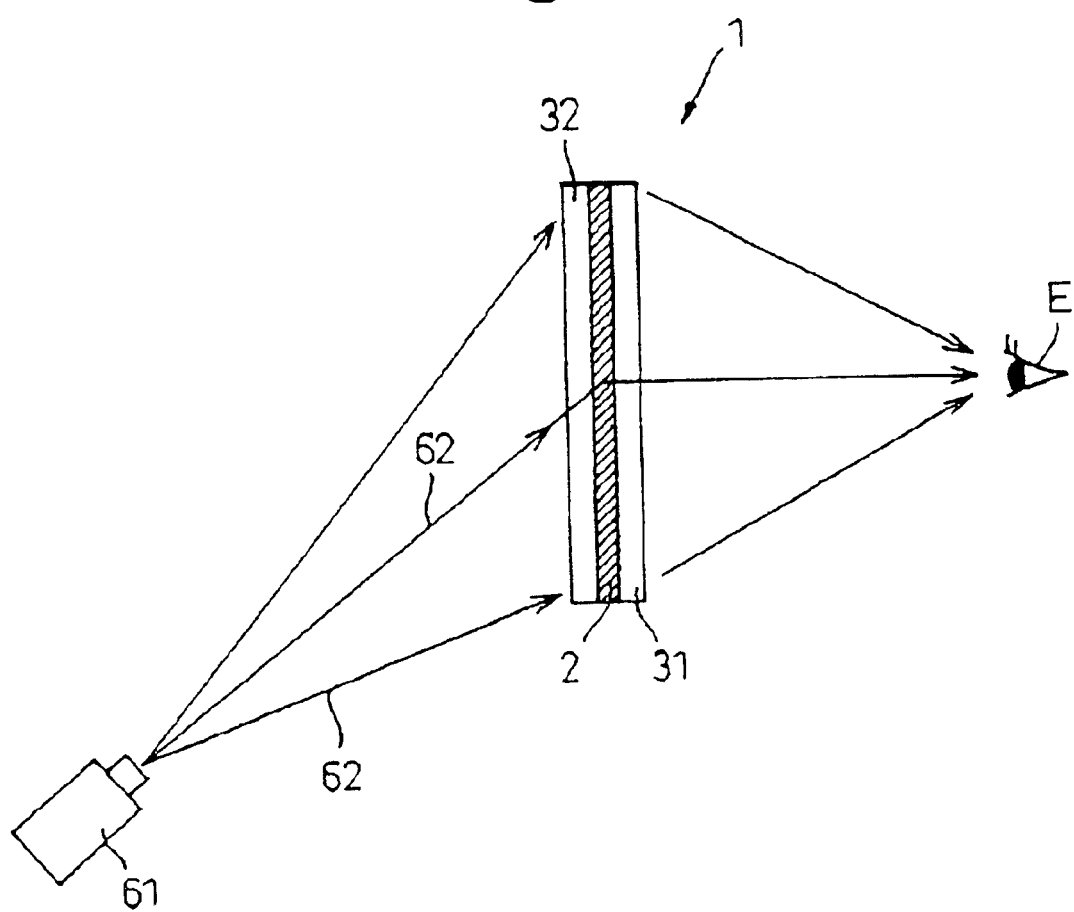

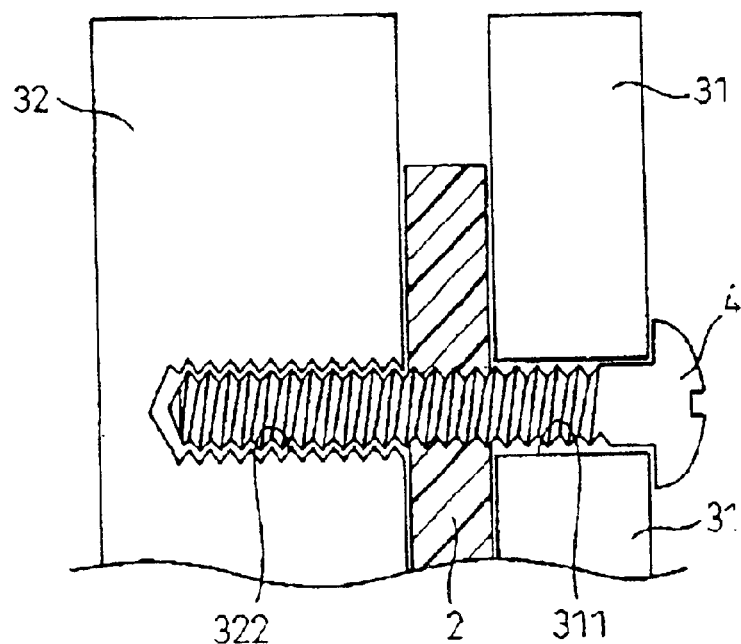
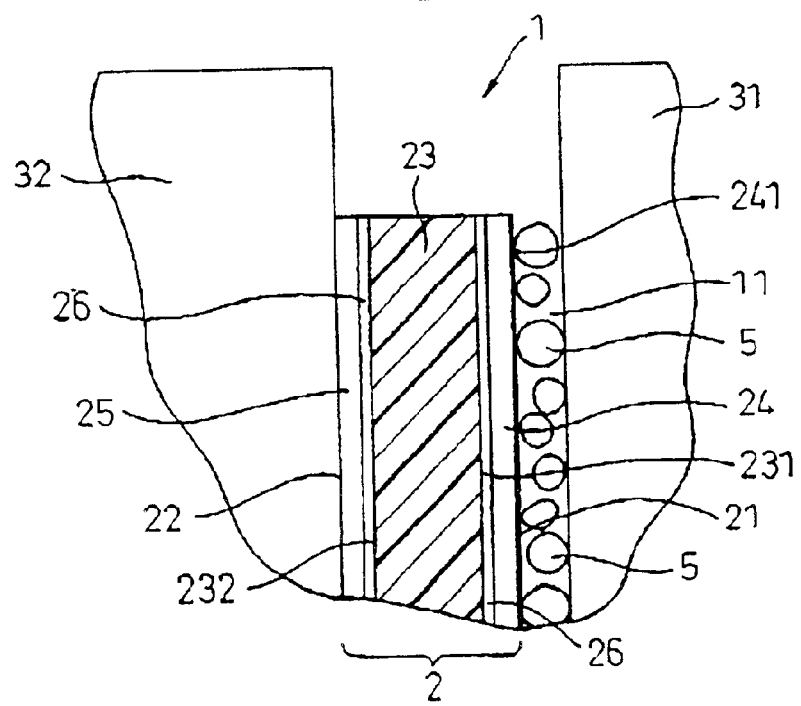

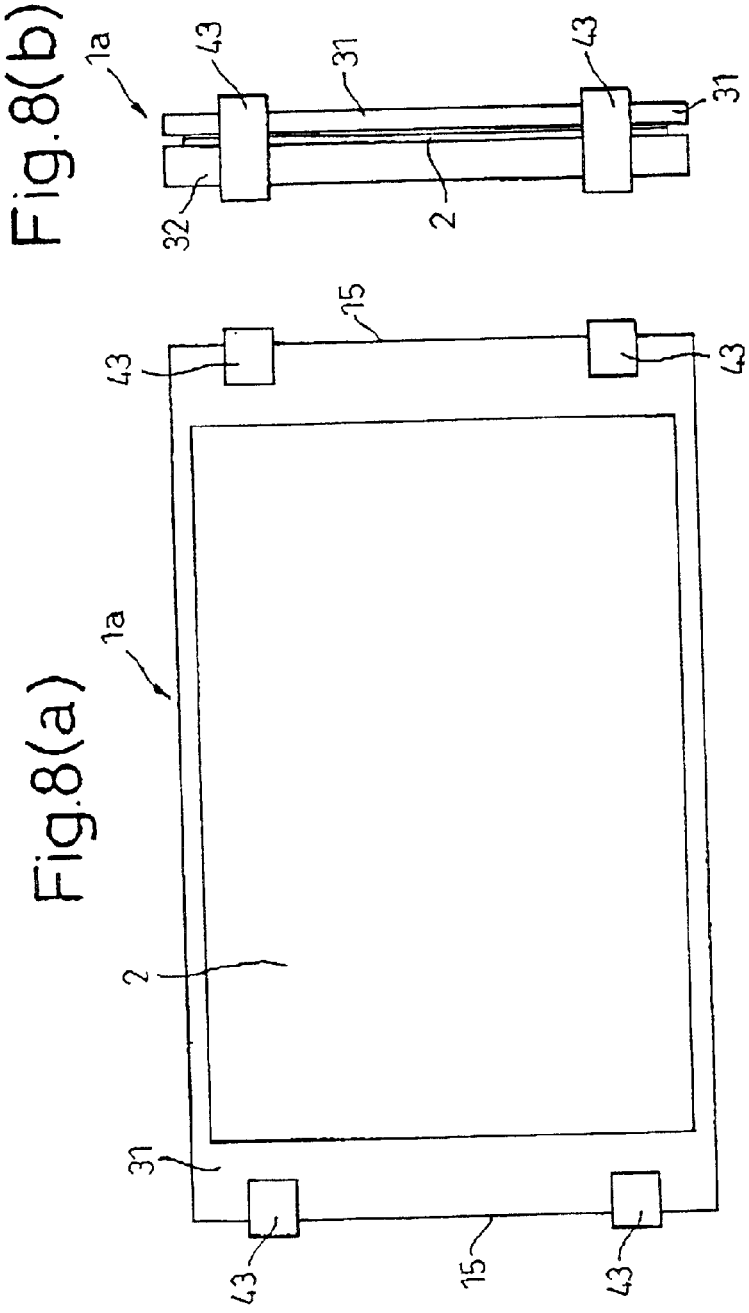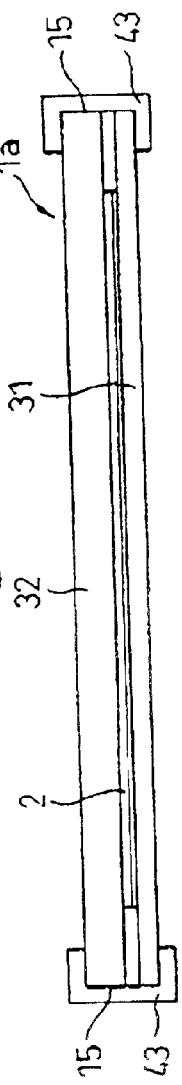

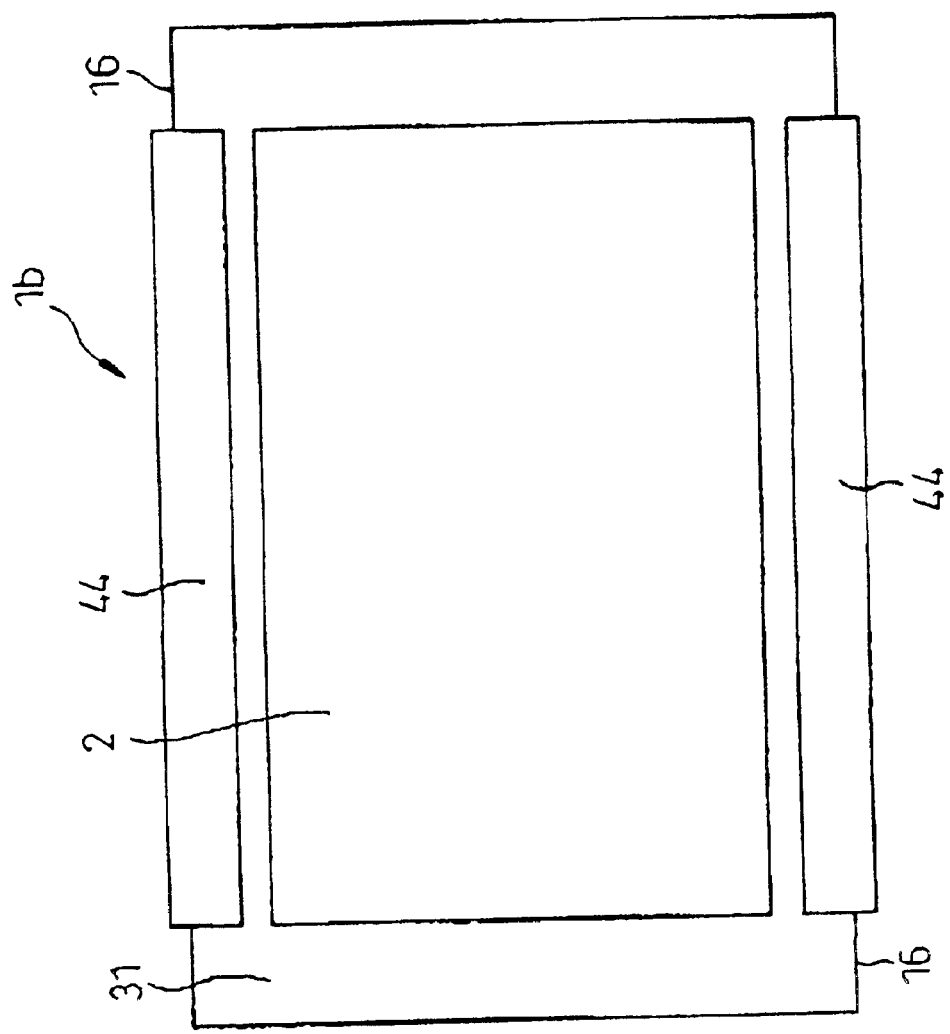

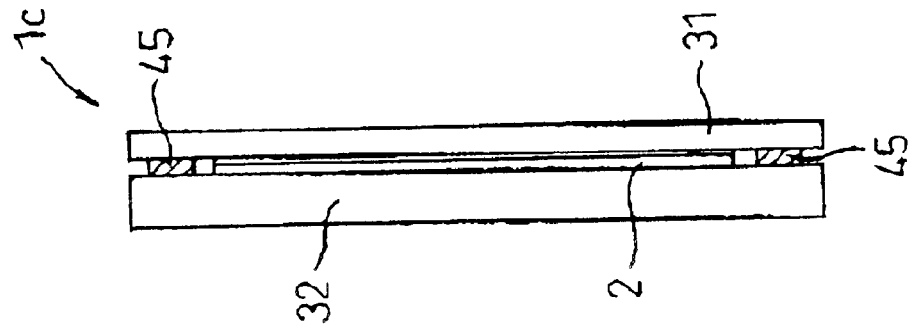
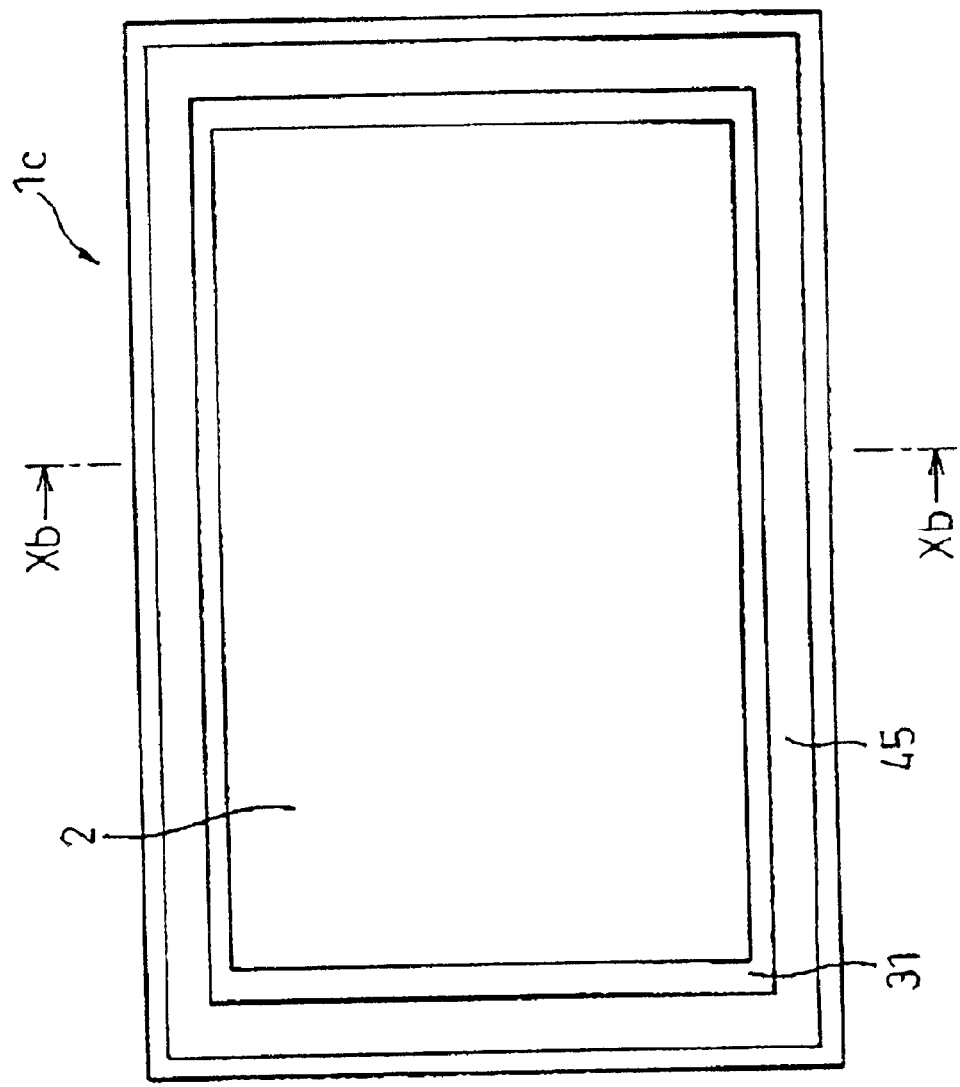

HOLOGRAM SCREEN

BACKGROUND OF THE INVENTION

1. Field of the Invention

The present invention relates to a hologram screen that is capable of regenerating an image by diffracting projected light.

2. Description of Related Art

A hologram screen that is capable of regenerating an image by diffracting projected light has been conventionally utilized, for example, for the purpose of displaying an advertisement on a shop window. As a versatile form of the above-mentioned hologram screens a screen formed by applying a hologram film to a resin plate with an adhesive has been known.

However, in the above-mentioned conventional hologram screen, the hologram film is exposed at its surface. Therefore, the hologram film may be separated from the resin plate, or may be scratched or otherwise damaged.

The resin plate may also be damaged. The above-mentioned hologram film is applied to the resin plate with an adhesive, and it is difficult to separate the hologram film from the resin plate without damaging the film. Therefore, when the resin plate is damaged, it is not possible to replace the resin plate with a new one to reuse the hologram film. Therefore, once the resin plate is damaged, the expensive hologram film has to be discarded. Further, when the hologram screen is leased, it is not possible to extend the rental use for a long period due to the above-mentioned problem.

SUMMARY OF THE INVENTION

It is an object of the present invention to overcome the aforementioned problem associated with the previous hologram screen and to provide a hologram screen which is capable of preventing separation and damage of the hologram film, and permits the hologram film to be reused easily, and which can be rented satisfactorily for a long period.

According to a first aspect of the invention, a hologram screen is provided which comprises a hologram film having the function of diffracting the light projected from a projector, and a first and a second transparent members which sandwich the hologram film so as to cover the film both from a front surface and from a back surface, characterized in that at least one of the first and the second transparent members is replaceable.

The most remarkable feature of the present invention is that the first and second transparent members sandwich the hologram film so as to cover same both from a front surface and from a back surface.

Terms, "front surface" and "back surface", are used herein only for convenience. As used herein, "front surface" means the surface on the side on which the first transparent member is located and "back surface" means the surface on the side on which the above-mentioned second transparent member is located.

Next, the operative effect of the present invention will be described.

In the above-mentioned hologram screen, the first and second transparent members sandwich the hologram film so as to cover same between them.

Therefore, there is no risk of the hologram film separating from the first transparent member or from the second transparent member. also, the hologram film is protected from being damaged.

Further, even if the first or second transparent member is damaged, the hologram film can be released from the sandwiching by the first and second transparent members and the damaged transparent member may be replaced with a new transparent member to thereby reuse the hologram film.

As described above, in accordance with the present invention, a hologram screen is provided in which the hologram film can be protected from separation and damage, and can be easily reused.

Next, according to a second aspect of the present invention, the first and second transparent members are preferably fixed to each other with screws.

The hologram film can be thereby easily and securely sandwiched between the first and second transparent members. Since the first and second transparent members can be easily detached from each other, reuse of the hologram film is further facilitated.

Next, according to a third aspect of the present invention, the screws can fix the first and second transparent members to each other by penetrating a through hole provided in one of the first and second transparent members and being threaded into a sprue or threaded hole provided in the other.

The hologram film can be thereby easily and securely sandwiched between the first and second transparent members, and the reuse of the hologram film is further facilitated.

When above-mentioned sprue (HELI-SERT) is used, there is no risk of damage to the first and second transparent members even if the first and second transparent members are attached and detached frequently.

According to a fourth aspect of the present invention, the above-mentioned screws can fix the first and second transparent members to each other by penetrating a through-hole provided in both first and second transparent members and being threaded into a nut.

In this manner, also in this case, the hologram film can be easily and securely sandwiched between the first and second transparent members, and the reuse of the hologram film is further facilitated.

There is no risk of damage to the first and second transparent members even if the first and second transparent members are attached and detached frequently.

Next, according to a fifth aspect of the present invention, the first and second transparent members can be fixed to each other with an adhesive.

In this case, a hologram screen having a good appearance and design can be obtained.

Next, according to a sixth aspect of the present invention, the first and second transparent members can be fixed to each other with a clip or clips.

In this case, a hologram screen that allows a high operational efficiency in mounting and replacing of the first and second transparent members.

Next, according to a seventh aspect of the present invention, the first and second transparent members are preferably formed from a resin, a glass, or a plastic film.

A hologram screen capable of regenerating a high quality images can be thereby obtained cheaply.

When the first and second transparent members are formed from a resin, a light weight hologram screen can be obtained.

When the first and second transparent members are formed from a plastic film, a hologram screen that can be applied to a window pane as has been done previously is obtained.

The above-mentioned resin may include, for example, polycarbonate, acrylic resin, vinyl chloride resin, and the like.

Next, according to an eighth aspect of the present invention, an anti-sticking agent is preferably interposed between the hologram film and at least one of the first and second transparent members.

For example, when the front surface of the hologram film and the first transparent member are of such a material property that they are likely to stick to each other, the above-mentioned anti-sticking agent is interposed between the front surface of the hologram film and the first transparent members. When the back surface of the hologram film and the second transparent member are of such a material property that they are likely to stick to each other, the above-mentioned anti-sticking agent may be interposed between the back surface of the hologram film and the second transparent members.

With such a construction, a gap is created between the hologram film and the first or second transparent member, and sticking of the hologram film to the first or second transparent member can be prevented. Degradation of image quality due to local sticking between the hologram film and the first or second transparent member can be thereby prevented. Also, in the state in which images are not being regenerated, the good design and appearance of the hologram screen can be maintained.

Next, according to a ninth aspect of the present invention, the aforementioned hologram film is comprised of a hologram layer that has the function of diffracting the light projected from a projector and a PET layer that has the hologram layer applied on at least one of the surfaces thereof and having a hard coat formed thereon. The above-mentioned anti-sticking agent is preferably interposed between the above-mentioned PET layer and at least one of the first and second transparent members.

With such a construction, the surface of the hologram film having a hard coat formed thereon can be prevented from sticking to the first or second transparent member.

Next, according to a tenth aspect of the present invention, the hologram film can be constructed such that the above-mentioned PET layer is applied to either the front surface or the back surface of the above-mentioned hologram layer, and the other surface of the hologram layer is applied to the first or second transparent member.

In this case, the hologram film is preferably applied to the transparent member less likely to be damaged based on the condition of use, and the like. For example, the hologram screen can be constructed using the side to which the hologram film is not applied as the side more likely to be damaged, for example, as the side facing observers.

With such a construction, the first or second transparent member that is disposed on the side more likely to be damaged, can be replaced to reuse the hologram film.

Next, according to an eleventh aspect of the present invention, the above-mentioned anti-contact agent is preferably spherical, cylindrical or scale-like in shape.

With such a construction, a gap is securely provided between the hologram film and the first or second transparent member, and sticking between them can be reliably prevented.

Next, according to a twelfth aspect of the present invention, the above-mentioned anti-sticking agent is preferably formed from inorganic material including, as a principal component, silicon dioxide, borosilicate glass, or aluminum oxide, plastic materials including, as a principal component, divinylbenzene or methyl ester methacrylate, or starch such as grape sugar, cane sugar.

With such a construction, sticking between the hologram film and the first or second transparent member can be reliably prevented.

Next, according to a thirteenth aspect of the present invention, the above-mentioned anti-sticking agent can be formed in powder form and be applied with a brush to the first transparent member, the second transparent member, or the hologram film.

With such a construction, the anti-sticking agent can be interposed easily and reliably between the hologram film and the first or second transparent member.

Next, according to a fourteenth aspect of the present invention, the anti-sticking agent can be formed in an aqueous suspension and be applied by spray coating to the first transparent member, the second transparent member, or the hologram film.

Also in this case, the above-mentioned anti-sticking agent can be interposed easily and reliably between the hologram film and the first or second transparent member.

Next, according to a fifteenth aspect of the present invention, the above-mentioned anti-sticking agent can be formed in aqueous suspension and be applied by spin coating to the first transparent member, the second transparent member, or the hologram film.

Also in this case, the above-mentioned anti-sticking agent can be interposed easily and reliably between the hologram film and the first or second transparent member.

Next, according to a sixteenth aspect of the present invention, the above-mentioned anti-sticking agent can be suspended in an alcohol solution and be applied by spin coating to the first transparent member, the second transparent member, or the hologram film.

Also in this case, the above-mentioned anti-sticking agent can be interposed easily and reliably between the hologram film and the first or second transparent member.

Next, according to a seventeenth aspect of the present invention, sealant material for preventing uneven contact is preferably interposed uniformly both between the hologram film and the first transparent member and between the hologram film and the second transparent member.

When the hologram film and the first or second transparent member are of such a material property that the contact is likely to become partial (uneven), the above-mentioned sealant material may be interposed between the hologram film and the first transparent member and between the hologram film and the second transparent member, respectively.

With such a construction, there is no gap between the hologram film and the first and second transparent members, respectively, and close contact over the entire surface without uneven contact can be achieved. Degradation of image quality due to the partial contact between the hologram film and the first or the second transparent member can be thereby prevented. Also, in the state in which images are not being regenerated, the good design and appearance of the hologram screen can be maintained. The sticking force of the sealant material with the first and the second transparent members is preferably such that an operator can manually separate the hologram screen from the transparent member with ease.

Next, according to an eighteenth aspect of the present invention, the above-mentioned sealant material is preferably glycerin, triethanolamine, or alcohols having a high boiling point such as ethylene glycol.

With such a construction, close contact between the hologram film and the first and the second transparent members can be achieved reliably and, when replacing the transparent member, the hologram screen can be easily separated from the transparent member.

Next, according to a nineteenth aspect of the present invention, a release agent may be coated on the entire front and back surfaces of the hologram film, and an adhesive layer may be provided via the release agent. Also, on the front and back surfaces, the first and the second transparent members which are larger than the hologram film are respectively applied with the first and the second transparent members being adhered to each other with an adhesive at the portion outside of the periphery of the hologram film.

By coating the above-mentioned release agent, even if the first and the second transparent members which are larger than the hologram film are adhered with an adhesive, the first and second transparent members are not adhered to the hologram film. Thus, the first and the second transparent members are adhered to each other only at the portion outside of the periphery of the hologram film.

Therefore, when the first or the second transparent member is damaged and needs to be replaced, only by cutting and removing the adhered portion, one can take out the hologram film easily with no damage, and use the hologram again.

As the above-mentioned release agent, silicone, for example, may be employed.

BRIEF DESCRIPTION OF THE DRAWINGS

FIG. 1(a) is a front view showing a hologram screen according to Embodiment 1 of the present invention;

FIG. 1(b) is a side view showing a hologram screen according to Embodiment 1 of the present invention;

FIG. 2 is a view useful for explaining the function of the hologram screen according to Embodiment 1;

FIG. 3 is a view useful for explaining fixing means for fixing the first and second transparent members using a screw according to Embodiment 1;

FIG. 4 is a partial enlarged sectional view showing the hologram screen according to Embodiment 1;

FIG. 8(a) is a front view showing a hologram screen according to Embodiment 5;

FIG. 8(b) is a side view showing a hologram screen according to Embodiment 5;

FIG. 8(c) is a top plan view showing a hologram screen according to Embodiment 5;

FIG. 9(a) is a front view showing a hologram screen according to Embodiment 5;

FIG. 9(b) is a side view showing a hologram screen according to Embodiment 5;

FIG. 10(a) is a front view showing a hologram screen according to Embodiment 6;

FIG. 10(b) is a sectional view taken along the line Xb—Xb of FIG. 10(a);

DESCRIPTION OF THE PREFERRED EMBODIMENTS

Embodiment 1

Figure 5:
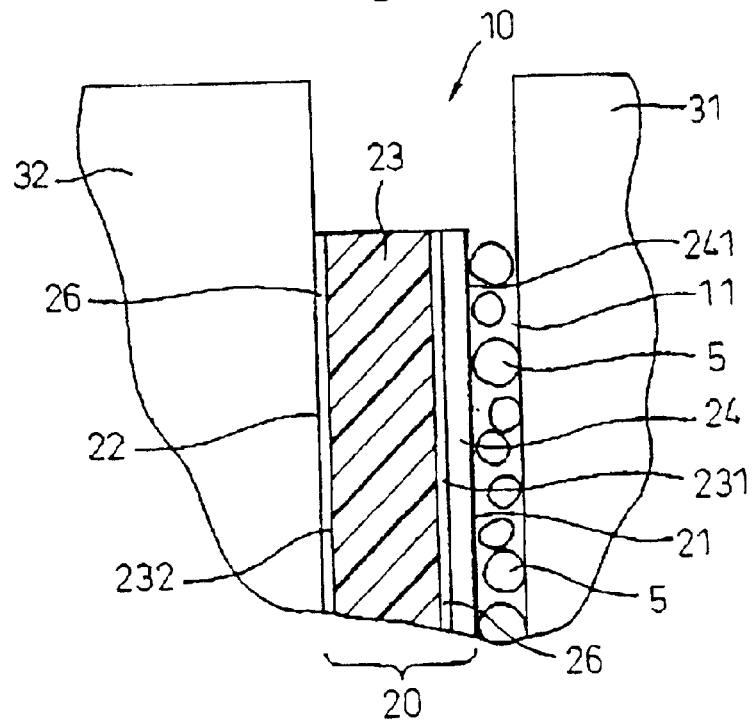
FIG. 5 is a partial enlarged sectional view showing the hologram screen according to Embodiment 2.

A hologram screen according to an Embodiment of the present invention will be described below with reference to FIGS. 1 through 4.

The hologram screen 1 according to the present Embodiment is, as shown in FIGS. 1(a) and 1(b), comprised of a hologram film 2 and a first transparent member 31 and a second transparent member 32 which together sandwich the hologram screen 2 so as to cover the same from a front surface 21 and a back surface 22.

The hologram film 2 has the function of diffracting the light 62 projected from a projector 61, as shown in FIG. 2. Thus, the hologram screen 1 is capable of diffracting the light 62 projected from the projector 61 so as to scatter and transmit the light, and thereby causing an observer E to recognize an image. The above-mentioned hologram screen 1 may be of a transmission type as shown, or alternatively, it may be of a reflection type which causes an observer on the side of the projector to recognize an image.

Also, as shown in FIG. 3, the first transparent member 31 and second transparent member 32 are fixed to each other by means of a screw 4. Thus, the above-mentioned screw 4 penetrates a through hole 311 provided in the first transparent member 31, and is threaded into a threaded hole 322 provided in the second transparent member 32, so as to fix the first transparent member 31 and second transparent member 32 to each other.

As shown in FIG. 1(a), the above-mentioned screw 4 is disposed at 4 location positioned outside of the hologram film 2.

The first transparent member 31 and the above-mentioned second transparent member 32 are formed from polycarbonate resin.

As shown in FIG. 4, an anti-sticking agent 5 is interposed between the hologram film 2 and the first transparent member 31. The anti-sticking agent 5 is spherical in shape, and is made of inorganic material having silicon dioxide as a principal component.

The above-mentioned anti-sticking agent 5 is about 0.5~100 μm in size, so that a gap 11 approximately 100 μm in length is thereby formed between the aforementioned hologram film 2 and the first transparent member 31.

As shown in FIG. 4, the aforementioned hologram film 2 is comprised of a hologram layer 23 and a PET layer 24 applied to the front surface 231 of the hologram layer 23 and having a hard coat 241 formed thereon. The above-mentioned anti-sticking agent 5 is interposed between the above-mentioned PET layer 24 and the first transparent member 31.

A PET layer 25 having no hard coat is applied to the back surface 232 of the above-mentioned hologram layer 23. The above-mentioned PET layers 24, 25 are applied to the hologram film 1 via an adhesive 26.

The method for interposing the above-mentioned anti-sticking agent 5 between the hologram film 2 and the first transparent member 31 may include, for example, the following treatments before sandwiching the hologram film 2 between the first transparent member 31 and second transparent member 32.

Thus, the above-mentioned anti-sticking agent 5 may be prepared in the form of powder, and applied with a brush to the first transparent member 31 or the aforementioned hologram film 2.

Alternatively, the above-mentioned anti-sticking agent 5 may be prepared in the form of aqueous suspension, and applied by spray coating to the first transparent member 31 or the hologram film 2.

Or, the above-mentioned anti-sticking agent 5 may be prepared in the form of aqueous suspension, and applied to the first transparent member 31 or the hologram film 2 by spin coating with a spinner rotating at high speed (500~1000 rpm).

Or, the above-mentioned anti-sticking agent 5 may be prepared in the form of suspension in alcohol solution, and applied by spin coating to the first transparent member 31 or the hologram film 2.

Next, the operative effect of the present Embodiment will be described below.

In the above-mentioned hologram screen 1, the first transparent member 31 and the second transparent member 32 sandwich the hologram film 2 so as to cover the same.

Therefore, there is no risk that the hologram film 2 is separated from the first transparent member 31 or second transparent member 32. Damage to the hologram film 2 can be thus prevented.

Even if the first transparent member 31 or the second transparent member 32 is damaged, sandwiching of the hologram film by the first transparent member 31 and the second transparent member 32 can be released and the damaged transparent member can be replaced with a new transparent member to reuse the hologram film 2.

Since the first transparent member 31 and the second transparent member 32 are fixed to each other by means of screws 4, the first transparent member 31 and second transparent member 32 can easily and securely sandwich the hologram film 2. Also, since the first transparent member 31 and second transparent member 32 can be attached and detached easily, the hologram film 2 can be reused with ease.

Since the first transparent member 31 and second transparent member 32 are formed from a resin, a light-weight hologram screen 1 that can regenerate images of high quality can be obtained cheaply.

The PET layer 24 which is applied on the front surface 21 of the hologram film 2 and which has a hard coat 241 formed thereon, is, in view of material property, likely to stick to the first transparent layer 31 made of a resin. Therefore, an anti-sticking agent 5 is interposed between the hologram film 2 and the first transparent member 31 (FIG. 4).

With such a construction, a gap 11 is provided between the hologram film 2 and the first transparent member 31, and sticking of the two surfaces can be thereby prevented. Thus, degradation of the image quality due to the partial sticking of the hologram film 2 to the first transparent member 31 can be prevented. Also, while images are not being regenerated, the good design and appearance of the hologram screen can be maintained.

The PET layer 25 on the back surface 22 of the hologram film 2 has no hard coat formed thereon and is thus unlikely to stick to the aforementioned second transparent member 32. Therefore, even if the above-mentioned anti-sticking agent 5 is not interposed between the hologram film 2 and the aforementioned second transparent member 32, problems such as degradation of image quality of the hologram screen 1 and the like, will not arise.

Since the above-mentioned anti-sticking agent is sherical in shape, a gap 11 can be reliably provided between the hologram film 2 and the first transparent member 31 and sticking of the two surfaces can be reliably prevented.

Also, since the above-mentioned anti-sticking agent is made of inorganic material having silicon dioxide as a principal component, the sticking of the hologram film 2 to the first transparent member 31 can be reliably prevented.

By adopting the method as described above for disposing the anti-sticking agent 5, the anti-sticking agent 5 can be easily and reliably interposed between the hologram film 2 and the first transparent member 31.

As has been described in the foregoing, according to the present Embodiment, a hologram screen that is capable of protecting the hologram film from separation and damage and permitting the hologram film to be reused easily, is provided.

Embodiment 2

The present Embodiment is, as shown in FIG. 5, an example of a hologram screen 10 in which the back surface 22 of the hologram film 20 is adhered to the second transparent member 32.

Thus, the hologram film 20 is the same as the hologram film 2 (FIG. 4) used in the Embodiment 1 except that the PET layer 25 on the back surface 22 is separated and removed The hologram film 20 is adhered via an adhesive 26 provided on the back surface 22 to the above-mentioned second transparent member 32.

Otherwise, it is the same as in the Embodiment 1.

In this case, the side of the first transparent member 31 to which the hologram film 20 is not adhered can be used as the side on which damage is relatively likely to arise, that is, as the observer's side.

With such a construction, even when the first transparent member 31 is damaged, it can be replaced with a new transparent member and the hologram film 20 can be reused.

Otherwise, it has the same operative effect as in the Embodiment 1.

Embodiment 3

Figure 6:
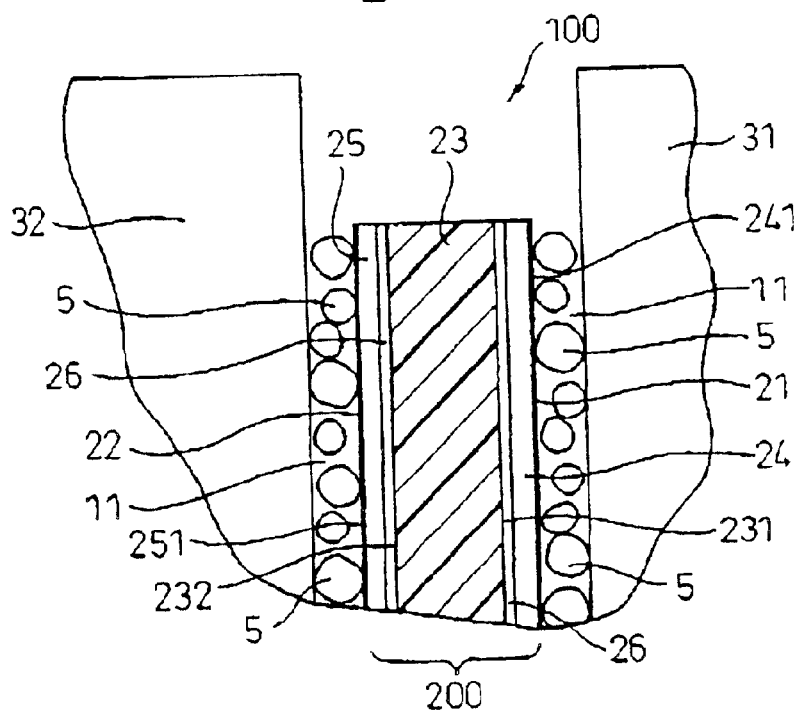
FIG. 6 is a partial enlarged sectional view showing the hologram screen according to Embodiment 3.

The present Embodiment is an example of a hologram screen 100 in which, as shown in FIG. 6, an anti-sticking agent 5 is disposed between the hologram film 200 and the first transparent member 31, and between the hologram film 200 and the second transparent member 32.

Otherwise, it is the same as in the Embodiment 1.

With such a construction, even when the back surface 22 of the hologram film 2 is, in terms of material property, likely to stick to the second transparent member 32, the sticking of the two surface can be prevented.

For example, this construction is effective when a hard coat 251 is also formed on the PET layer 25 on the back surface 22 of the hologram film 2.

Otherwise, the present Embodiment has the same operative effect as in the Embodiment 1.

Embodiment 4

Figure 7A:
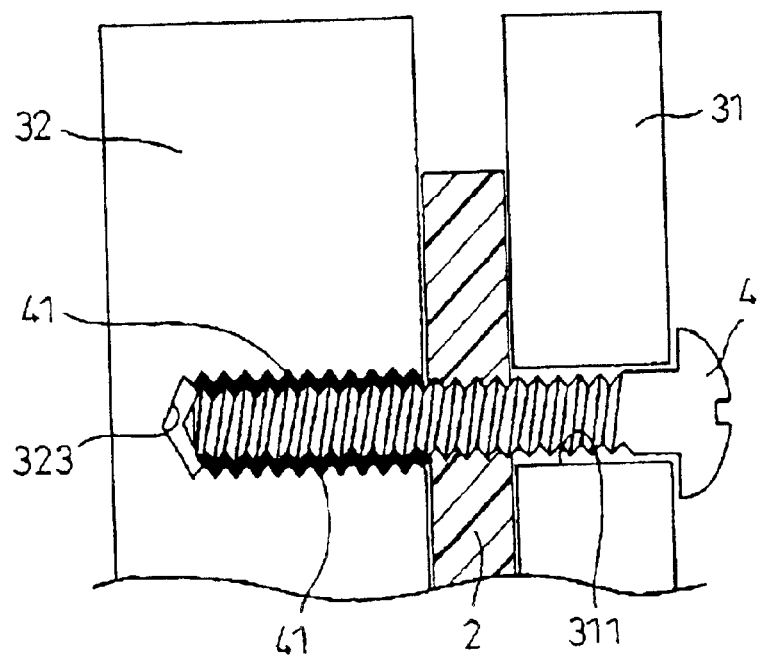
FIG. 7(a) is a view useful for explaining fixing means using a screw and a sprue according to Embodiment 4.
Figure 7B:
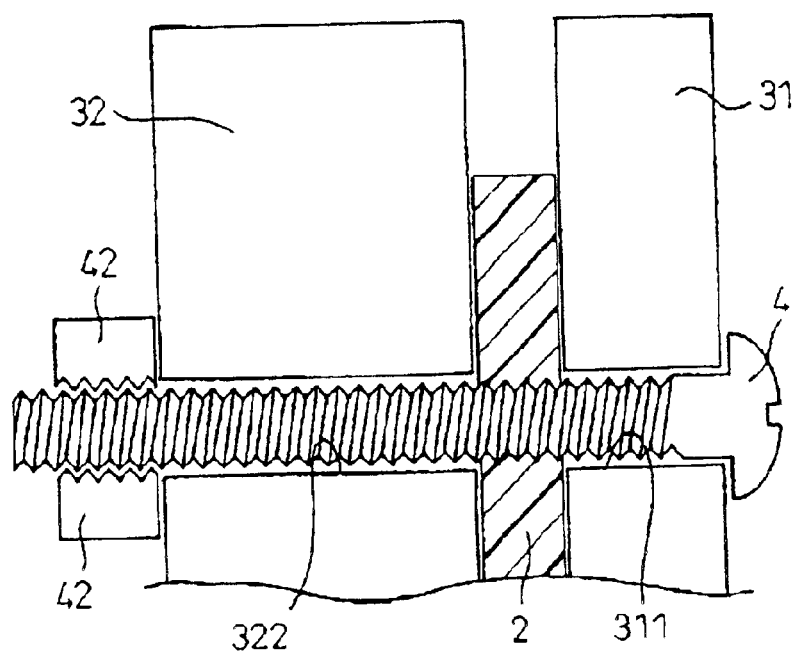
FIG. 7(b) is a view useful for explaining fixing means using a screw and a nut according to Embodiment 4.

As shown in FIGS. 7(a) and 7(b), the present embodiment is an examples which a sprue 41 (FIG. 7(a)) or a nut 42 (FIG. 7(b)) is used for threading the screw 4 as fixing means for fixing the first transparent member 31 and the second transparent member 32 to each other.

Thus, when the above-mentioned sprue 41 is used, as shown in FIG. 7(a), the screw 4 penetrates a through hole 311 provided in the first transparent member 31, and is threaded into the sprue 41 provided in the second transparent member 32 to thereby fix the first transparent member 31 to the second transparent member 32.

The above-mentioned sprue 41 is embedded so as to be threaded into a threaded hole 323 that is formed beforehand in the above-mentioned second transparent member 32, and the above-mentioned screw 4 is threaded into the sprue 41 embedded in the above-mentioned second transparent member 32.

When the above-mentioned nut 42 is used, as shown in FIG. 7(b), the screw 4 penetrates the through-holes provided both in the first transparent member 31 and second transparent member 32, and is threaded into a nut 42 to thereby fix the first transparent member 31 and second transparent member 32 to each other.

Otherwise, the present Embodiment is the same as Embodiment 1.

With such a construction, the hologram film 2 can be sandwiched easily and reliably between the first transparent member 31 and second transparent member 32, and reuse of the hologram film is thereby further facilitated.

Even if the first transparent member 31 and second transparent member 32 are attached and detached frequently, there is no risk that the first transparent member 31 or second transparent member 32 is damaged.

Otherwise, the present Embodiment has the same operative effect as in the Embodiment 1.

Embodiment 5

As shown in FIGS. 8(a) through 8(c) and FIGS. 9(a) and 9(b), the present Embodiment is an example of a hologram screen 1a, 1b in which clips 43, 44 are used as fixing means for fixing the first transparent member 31 and second transparent member 32 to each other.

As shown in FIGS. 8(a) through 8(c), the above-mentioned hologram screen 1a has clips 43 disposed at two locations on each of opposing end edges 15. Each clip 43 is formed, as shown in FIG. 8(c), in the cross sectional shape Π, and is attached so as to clamp together the first transparent member 31 and second transparent member 32.

The clip 43 is made of, for example, metal or resin, and is biased so as to clamp together the first transparent member 31 and second transparent member 32.

Also, as shown in FIGS. 9(a) and 9(b), long clips 44 may be used to clamp together the first transparent member 31 and second transparent member 32 at the two opposing end edges 16 of the hologram screen 1b.

Otherwise, the present Embodiment is the same as the Embodiment 1.

With this construction, a through hole or a threaded hole needs not be formed in the first transparent member 31 or the second transparent member 32, and the hologram screen 1a or 1b can be fabricated easily.

Also, the first transparent member 31 and the second transparent member 32 can be attached and detached easily. When the first transparent member 31 or the second transparent member 32 is damaged, it can be easily replaced with a new one, so that reuse of the hologram film 2 is further facilitated.

As shown in FIGS. 9(a) and 9(b), by using the long sized clips 44, the first transparent member 31 and the second transparent member 32 can be fixed to each other more reliably.

Otherwise, the present Embodiment has the same operative effect as in the Embodiment 1.

Embodiment 6

As shown in FIGS. 10(a) and 10(b), the present Embodiment is an example of a hologram screen 1c in which the first transparent member 31 and the second transparent member 32 are fixed to each other with an adhesive 45.

Thus, as shown in FIGS. 10(a) and 10(b), an adhesive 45 is interposed between the first transparent member 31 and the second transparent member 32 at the periphery of the hologram film 2, and the first transparent member 31 and second transparent member 32 are adhered to each other with the adhesive 45.

The above-mentioned adhesive 45 is disposed so as not to come into contact with the above-mentioned hologram 2.

Otherwise, the present Embodiment is the same as the Embodiment 1.

In this case, a hologram screen 1c having excellent appearance and design can be obtained.

Otherwise, the present Embodiment has the same operative effect as in the Embodiment 1.

Embodiment 7

Figure 11:
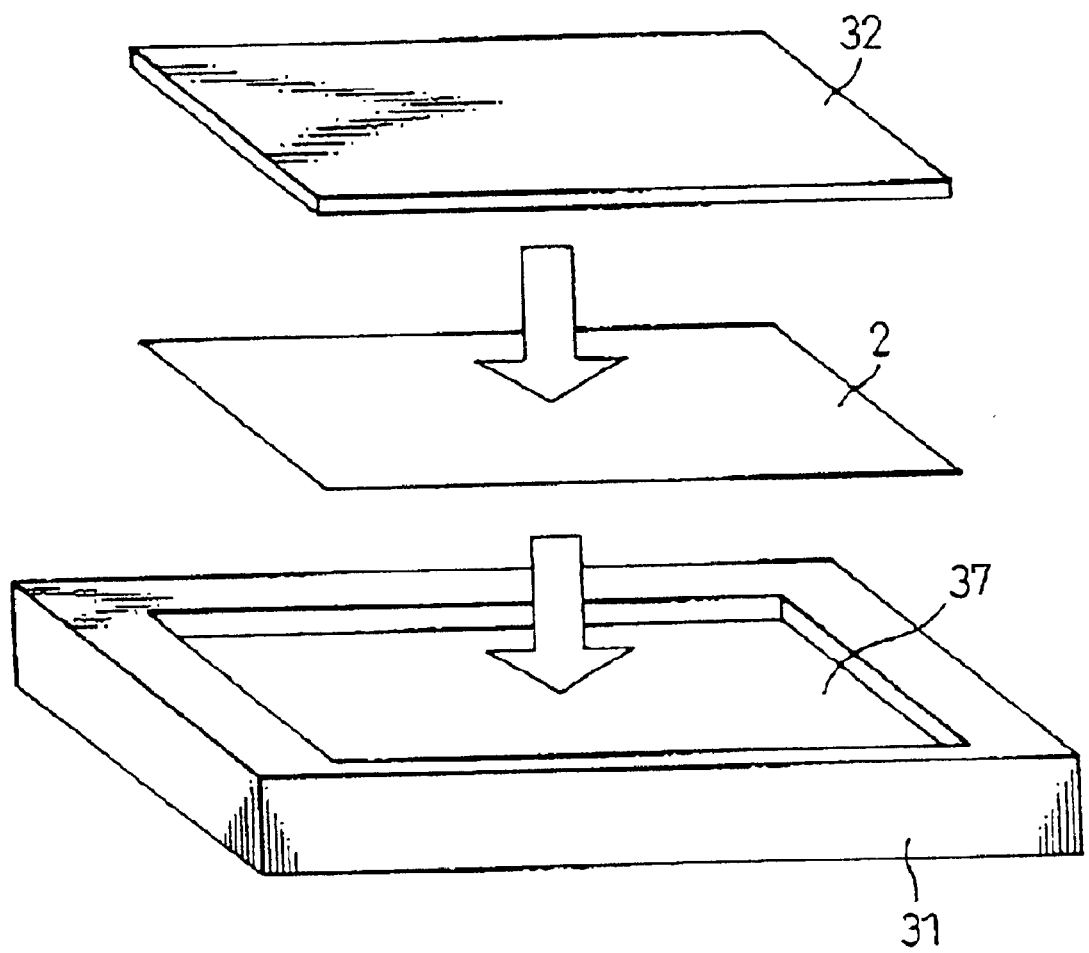
FIG. 11 is a perspective view showing the first transparent member, the hologram film and the second transparent member according to Embodiment 7.
Figure 12:
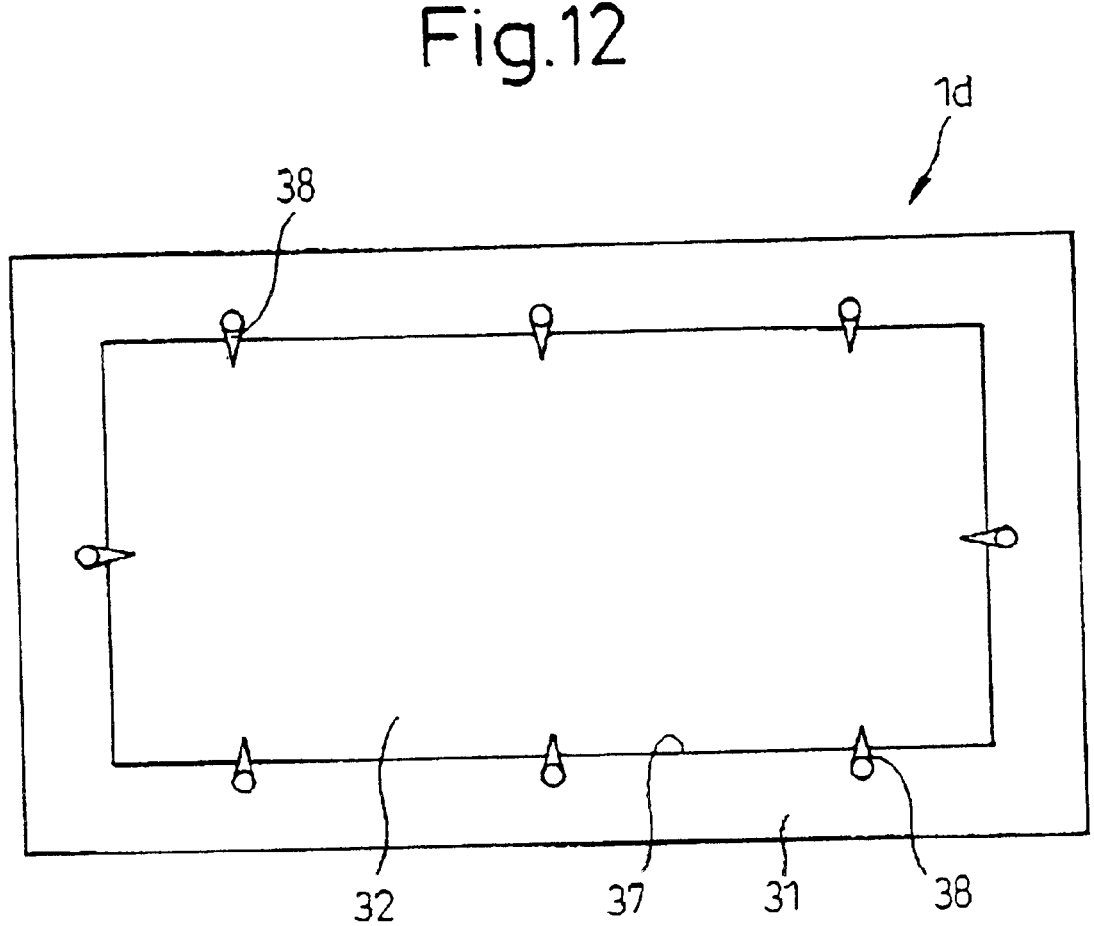
FIG. 12 is a rear view showing the hologram screen according to Embodiment 7.

As shown in FIGS. 11 and 12, the present Embodiment is an example of hologram screen 1d in which a spot facing 37 capable of containing the hologram film 2 is provided as simple means for fixing the hologram film 2 in the first transparent member 31.

Thus, the hologram screen 1d is obtained, as shown in FIG. 11, by placing the hologram film 2 into a spot facing 37 in the first transparent member 31 and covering it from above with the second transparent member 32. As shown in FIG. 12, fitting pins 38 are disposed around the spot facing 37 of the first transparent member 31, and the second transparent member 32 is fixed to the first transparent member 31 with the fitting pins 38.

The spot facing may be provided in the second transparent member 32, instead of the first transparent member 31.

The first transparent member 31 and second transparent member 32 used in the present Embodiment are preferably made of a highly transparent resin such as acrylic resin or Polycarbonate resin.

Also, in order to ensure good design and appearance of the hologram screen 1d, the fitting pins 38 are preferably transparent.

Otherwise, the present Embodiment is the same as the Embodiment 1.

The hologram screen 1d of the present Embodiment is of the so-called picture frame type. with this construction, the labor of positioning the hologram film can be saved and need for forming a through hole or a threaded hole is eliminated. Therefore, the hologram screen id can be fabricated easily. Otherwise, the present Embodiment has the same operative effect as in the Embodiment 1.

Embodiment 8

Figure 13:
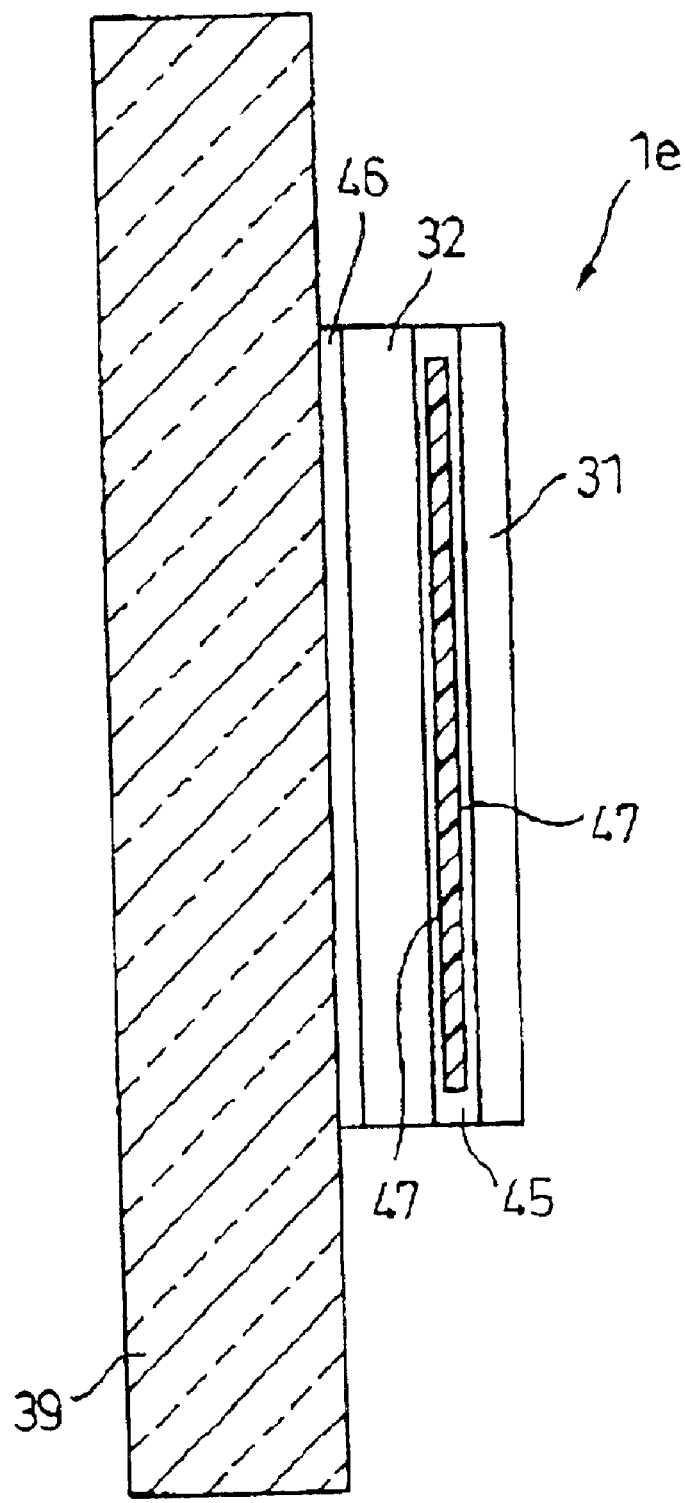
FIG. 13 is a front view showing the hologram screen according to Embodiment 8.
Figure 14:
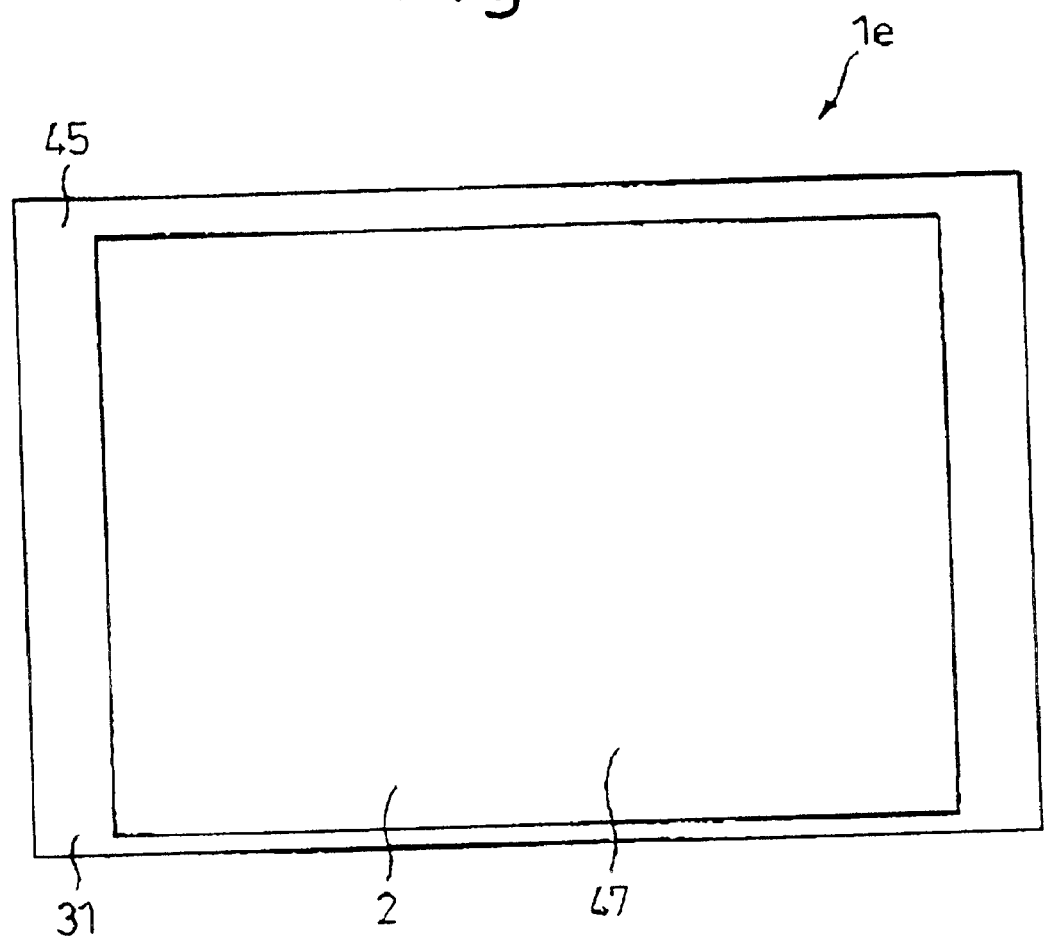
FIG. 14 is a sectional view showing the hologram screen applied to a window pane according to Embodiment 8.

As shown in FIGS. 13 and 14, the present Embodiment is an example of a hologram screen 1e in which the same hologram screen 1e as in the Embodiment 6 can be adhered directly to a window pane.

As shown in FIG. 13, an adhesive 46 is disposed on the outer surface of the first transparent member 31 or the second transparent member 32 (the second transparent member 32 in FIG. 13).

The first transparent member 31 and the second transparent member 32 used herein are PET films.

As shown in FIGS. 13 and 14, when the first transparent member 31 and the second transparent member 32 are fixed to each other with an adhesive 45, a release agent 47 such as silicone may be applied to the hologram film 2 beforehand, and the above-mentioned adhesive 45 may be applied to the entire surface of the first transparent member 31 or the second transparent member Otherwise, the present Embodiment is the same as the Embodiment 1.

With this treatment, the need to dispose the adhesive 45 only at the periphery of the hologram film 2 as in the Embodiment 6 is eliminated, and the hologram screen can be fabricated easily.

The release agent 47 prevents the adhesive 45 from being adhered to the hologram film 2, so that, when the first transparent member 31 or the second transparent member 32 is damaged, by cutting off the portion where the first transparent member 31 and the second transparent member 32 are directly adhered to each other, the hologram film 2 can be taken out and reused easily.

Otherwise, the present Embodiment has the same operative effect as in the Embodiment 1.

Embodiment 9

As shown in FIGS. 15 through 18, the present Embodiment is an example of a hologram screen in which a sealant 61 is used to sandwich the hologram film 2 between the first transparent member 31 and the second transparent member 32.

Figure 15:
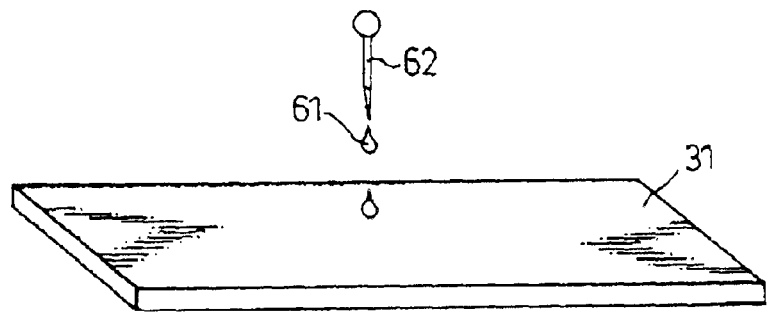
FIG. 15 is a view useful for explaining the fabrication method of a hologram screen according to Embodiment 9.
Figure 16:
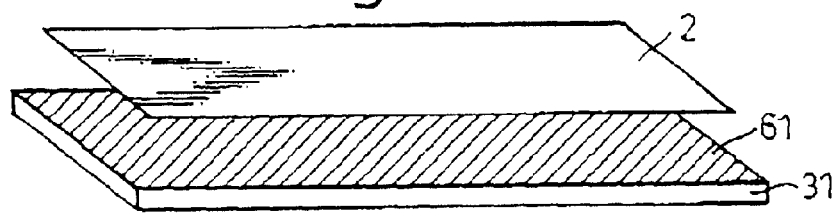
FIG. 16 is a view, continued from FIG. 15, that is useful for explaining the fabrication method of a hologram screen according to Embodiment 9.
Figure 17:
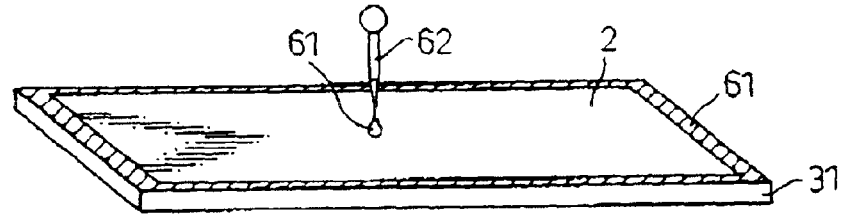
FIG. 17 is a view continued from FIG. 16 that is useful for explaining the fabrication method of a hologram screen according to Embodiment 9.
Figure 18:
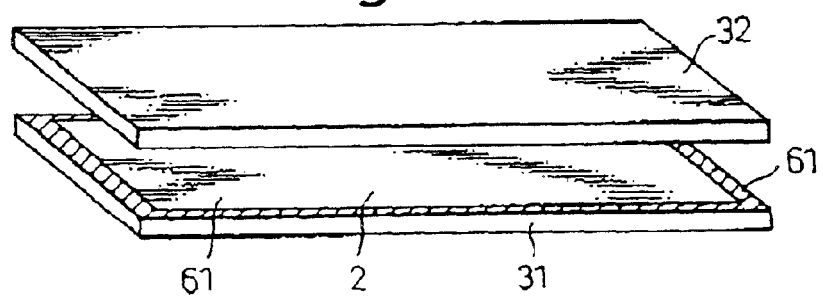
FIG. 18 is a view continued from FIG. 17 that is useful for explaining the fabrication method of a hologram screen according to Embodiment 9.

In this case, as shown in FIG. 15, using an injector 62, the above-mentioned sealant 61 is dropped on the first transparent member 31. The amount of dropped sealant 61 is such that the sealant 61 is uniformly spread over the whole surface of the first transparent member 31. When the sealant 61 is sufficiently spread, the hologram film 2 is placed as shown in FIGS. 16 and 17, and a suitable amount of the sealant 61 is again dropped from above (FIG. 17, FIG. 18). Then, the second transparent member 32 is placed from above so as to sandwich the hologram film 2 between the first transparent member 31 and the second transparent member 32 (FIG. 18). Otherwise, the present Embodiment is the same as the Embodiment 1.

With this construction, the hologram film 2 can be brought into close contact with the first transparent member 31 or the second transparent member 32 uniformly over the entire surface. Thus, partial (uneven) contact between the hologram film 2 and the first transparent member 31 or the second transparent member 32 is prevented, and the degradation of image quality can thereby be prevented. Also, while images are not being regenerated, the good design and appearance of the hologram screen can be maintained. Otherwise, the present Embodiment has the same operative effect as in the Embodiment 1.

What is claimed is:

1. A hologram screen comprising:
   a hologram film for diffracting light projected from a projector; and
   a first transparent member and a second transparent member which together sandwich the hologram film to cover the same from a front surface and a back surface thereof;
   wherein at least one of said first transparent member and second transparent member is replaceable, said first and second transparent members being fixed to each other with screws, each of said screws penetrating a through-hole provided in one of said first and second transparent members and being threaded into a sprue or a threaded hole provided in the other of said first and second transparent members to each other.

2. A hologram screen according to claim 1, wherein said first transparent member and second transparent member are fixed to each other with an adhesive.

3. A hologram screen according to claim 1, wherein said first transparent member and second transparent member are fixed to each other with clips.

4. A hologram screen according to claim 1, wherein said first transparent member and second transparent member are made of resin, glass, or plastic film.

5. A hologram screen comprising:
   a hologram film for diffracting light projected from a projector, said hologram film comprising a hologram layer having the function of diffracting the light projected from the projector and a PET layer adhered to at least one of the surfaces of the hologram layer and having a hard coat applied thereto; and
   a first transparent member and a second transparent member which together sandwich the hologram film to cover the hologram film from a front surface and a back surface thereof;
   wherein at least one of said first transparenet member and second transparent member is replaceable, wherein an anti-sticking agent is interposed between said PET layer and at least one of said first transparent member and second transparent member.

6. A hologram screen according to claim 5, wherein said hologram film has said PET layer on one of the front and back surfaces of said hologram layer, and wherein the other surface of said hologram layer is adhered either to said first transparent member or to said second transparent member.

7. A hologram screen according to claim 5, wherein said anti-sticking agent is in the shape of spheres, cylinders, or scales.

8. A hologram screen according to claim 5, wherein said anti-sticking agent is made of inorganic material containing, as a principal component, silicon dioxide, borosilicate glass, or aluminium oxide, or a plastic material containing, as a principal component, divinylbenzene, or methyl ester methacrylate, or a starch sugar comprising at least one of grape sugar or cane sugar.

9. A hologram screen according to claim 5, wherein said anti-sticking agent is made in the form of powder and is applied using a brush to said first transparent member or second transparent member, or to said hologram film.

10. A hologram screen according to claim 5, wherein said anti-sticking agent is made in the form of aqueous suspension and is applied by means of spray coating to said first transparent member or second transparent member, or to said hologram film.

11. A hologram screen according to claim 5, wherein said anti-sticking agent is made in the form of aqueous suspension and is applied by means of spin coating to said first transparent member or second transparent member, or to said hologram film.

12. A hologram screen according to claim 5, wherein said anti-sticking agent is made in the form of alcoholic suspension and is applied by means of spin coating to said first transparent member or second transparent member, or to said hologram film.

13. A hologram screen comprising:
- a hologram film for diffracting light projected from a projector; and
- a first transparent member and a second transparent member which together sandwich the hologram film to cover the hologram film from a front surface and a back surface thereof;
- wherein at least one of said first transparenet member and second transparent member is replaceable and a sealant is uniformly interposed in order to prevent partial sticking both between said hologram film and said first transparent member and between said hologram film and said second transparent member, said sealant comprising an alcohol selected from the group consisting of: glycerol, trethanolamine, or ethylene glycol.

14. A hologram screen comprising:
- a hologram film for diffracting light projected from a projector; and
- a first transparent member and a second transparent member which together sandwich the hologram film to cover the hologram film from a front surface and a back surface thereof;
- wherein at least one of said first transparent member and second transparent member is replaceable and a release agent is coated on the entire front and back surfaces of said hologram film and an adhesive is provided via the release agent, and wherein the first transparent member and the second transparent member are larger than said hologram film and are applied on said front and back surfaces of said hologram film such that the first transparent member and second transparent member are adhered to each other with an adhesive at a peripheral portion thereof that is outside of the circumference of said hologram film.

15. A hologram screen comprising:
- a hologram film for diffracting light projected from a projector; and
- a first transparent member and a second transparent member which together sandwich the film to cover the hologram film from a front surface and a back surface thereof;
- wherin at least one of said first trnasparent member and second transparent member is replaceable, said first and second transparent members being fixed to each other by screws, each of said screws penetrating through-holes provided in both the first and second transparent members being threaded into a nut, thereby fixing the first and second transparent members to each other.

* * * * *

UNITED STATES PATENT AND TRADEMARK OFFICE
CERTIFICATE OF CORRECTION

PATENT NO. : 6,829,066 B2
DATED : December 7, 2004
INVENTOR(S) : Suzuki et al.

It is certified that error appears in the above-identified patent and that said Letters Patent is hereby corrected as shown below:

Column 12,
Line 3, delete "the same" and insert -- the hologram film --.
Line 12, after "members" insert -- , thereby fixing said first transparent member and second transparent members --.

Column 14,
Line 25, after "members" insert -- and --.

Signed and Sealed this

Third Day of May, 2005

JON W. DUDAS
*Director of the United States Patent and Trademark Office*